United States Patent
Kwon

(10) Patent No.: US 8,342,573 B2
(45) Date of Patent: Jan. 1, 2013

(54) PASSENGER AIRBAG SYSTEM

(75) Inventor: Hae Wook Kwon, Yongin-si (KR)

(73) Assignee: Hyundai Mobis Co., Ltd, Yongin-si, Gyeonggi-do (KR)

( * ) Notice: Subject to any disclaimer, the term of this patent is extended or adjusted under 35 U.S.C. 154(b) by 161 days.

(21) Appl. No.: 12/851,665

(22) Filed: Aug. 6, 2010

(65) Prior Publication Data

US 2011/0260431 A1    Oct. 27, 2011

(30) Foreign Application Priority Data

Apr. 23, 2010    (KR) ........................ 10-2010-0038010

(51) Int. Cl.
*B60R 21/2338*    (2011.01)
(52) U.S. Cl. .................................................. 280/743.2
(58) Field of Classification Search ................ 280/743.2
See application file for complete search history.

(56) References Cited

U.S. PATENT DOCUMENTS

| | | | | |
|---|---|---|---|---|
| 3,879,057 A * | 4/1975 | Kawashima et al. | ...... | 280/743.2 |
| 3,907,327 A * | 9/1975 | Pech | ........................ | 280/729 |
| 5,308,113 A * | 5/1994 | Moriset | ................... | 280/743.2 |
| 5,489,119 A * | 2/1996 | Prescaro et al. | ........ | 280/743.2 |
| 5,609,363 A * | 3/1997 | Finelli | ..................... | 280/743.2 |
| 5,887,894 A * | 3/1999 | Castagner et al. | ........ | 280/743.2 |
| 6,250,677 B1 * | 6/2001 | Fujimura | .................. | 280/743.2 |
| 6,254,130 B1 * | 7/2001 | Jayaraman et al. | ........ | 280/743.2 |
| 6,334,627 B1 * | 1/2002 | Heym et al. | ............... | 280/743.2 |
| 6,554,317 B2 * | 4/2003 | Lorenz et al. | ............ | 280/743.1 |
| 6,616,184 B2 * | 9/2003 | Fischer | ..................... | 280/743.2 |
| 6,736,426 B2 * | 5/2004 | Winters et al. | ............ | 280/743.2 |
| 7,360,789 B2 * | 4/2008 | Bito | ........................... | 280/743.1 |
| 7,377,548 B2 * | 5/2008 | Bauer et al. | ............... | 280/743.2 |
| 7,396,045 B2 * | 7/2008 | Aranzulla et al. | ........ | 280/743.2 |
| 7,455,317 B2 * | 11/2008 | Bito | ............................ | 280/732 |
| 7,484,757 B2 * | 2/2009 | Thomas et al. | ............ | 280/743.2 |
| 7,568,731 B2 * | 8/2009 | Miyata | ...................... | 280/743.2 |
| 7,597,356 B2 * | 10/2009 | Williams | ..................... | 280/739 |
| 7,621,561 B2 * | 11/2009 | Thomas et al. | ............ | 280/743.2 |
| 7,784,828 B2 * | 8/2010 | Matsu et al. | ................ | 280/739 |
| 7,789,421 B2 * | 9/2010 | Issler et al. | ................ | 280/743.2 |
| 7,793,978 B2 * | 9/2010 | Vigeant et al. | ............. | 280/743.2 |
| 7,862,073 B2 * | 1/2011 | Thomas | ....................... | 280/729 |
| 7,914,041 B2 * | 3/2011 | Aranzulla et al. | ......... | 280/743.2 |
| 7,922,197 B2 * | 4/2011 | Fukawatase et al. | ........ | 280/739 |
| 7,931,297 B2 * | 4/2011 | Abe et al. | ...................... | 280/739 |
| 7,946,622 B2 * | 5/2011 | Niwa et al. | ................. | 280/743.2 |
| 7,959,184 B2 * | 6/2011 | Fukawatase et al. | ......... | 280/739 |

(Continued)

FOREIGN PATENT DOCUMENTS

| | | |
|---|---|---|
| JP | 2002-200953 A | 7/2002 |
| JP | 2008-201214 A | 9/2008 |
| KR | 10-2008-0017718 | 2/2008 |
| KR | 10-2009-0064212 A | 6/2009 |

*Primary Examiner* — Paul N Dickson
*Assistant Examiner* — Nicole Verley
(74) *Attorney, Agent, or Firm* — Sherr & Jiang, PLLC

(57) ABSTRACT

The present invention provides a passenger airbag system that can prevent the airbag cushion from pressing the head of an occupant in a child restraint system mounted on the passenger seat.

A passenger airbag system according to an embodiment of the present invention includes: an airbag cushion inflated by gas flowing inside and including a head contact portion that contacts the head of an occupant in a child restraint system mounted on the passenger seat; a strap connected to the head contact portion; and a tether connected to the airbag cushion and pulling the strap such that the head contact portion is depressed, when the airbag cushion inflates.

13 Claims, 4 Drawing Sheets

U.S. PATENT DOCUMENTS

| | | | |
|---|---|---|---|
| 7,967,331 B2 * | 6/2011 | Lim | 280/729 |
| 8,002,309 B2 * | 8/2011 | Kim et al. | 280/729 |
| 2006/0186656 A1 * | 8/2006 | Kumagai | 280/743.2 |
| 2007/0045997 A1 * | 3/2007 | Abe et al. | 280/729 |
| 2007/0126219 A1 * | 6/2007 | Williams | 280/739 |
| 2007/0205591 A1 * | 9/2007 | Bito | 280/743.2 |
| 2008/0073890 A1 * | 3/2008 | Williams et al. | 280/739 |
| 2010/0102542 A1 * | 4/2010 | Nakajima et al. | 280/743.2 |
| 2010/0225094 A1 * | 9/2010 | Rose et al. | 280/729 |
| 2011/0062693 A1 * | 3/2011 | Williams | 280/743.2 |

* cited by examiner

PASSENGER AIRBAG SYSTEM

CROSS REFERENCE TO PRIOR APPLICATIONS

This application claims priority to Korean Patent Application No. 10-2010-0038010 (filed on Apr. 23, 2010), which is hereby incorporated by reference in its entirety.

BACKGROUND OF THE INVENTION

1. Field of the Invention

The present invention relates to a passenger airbag system, more particularly a passenger airbag system in which the portion of an airbag cushion which contacts the head of the occupant in a child restraint system mounted on the passenger seat is depressed when the airbag cushion inflates.

2. Description of the Related Art

In general, vehicles are equipped with airbag systems that prevent passengers from being hurt by direct impact against the structure of the vehicle by inflating between the structure of the vehicle and the passengers in a collision.

The airbag systems are operated by an ACU (Airbag Control Unit) that controls an inflator, which is a gas generator, in response to a signal detected by a sensor that senses a collision. That is, as the gas-generating substance inside the inflator is exploded by a control command from the ACU and gas is generated, the gas flows into the airbag cushion connected to the inflator and the airbag cushion is inflated by the gas flowing inside, thereby protecting the passenger.

The airbag cushions, however, are generally manufactured to be expanded by expansion pressure for protecting adults, in consideration of the body conditions of adults. However, in some cases, not only adults, but infants or children sit in the passenger seat, the excessive expansion pressure of the passenger airbag cushion is potentially a dangerous life threatening factor for of the infants or children.

In practice, North America has established a law to preclude infants and children from being hurt due to excessive expansion pressure of the passenger airbag cushion, by classifying the passengers in the passenger seat, which are infants to 1 year or under and 3 years or under, and children 6 years or under.

Therefore, there have been conducted many researches for developing passenger airbag cushions for protecting all passengers, that is, infants 1 year or under, 3 years or under, and children 6 years or under, in addition to adults, by controlling the expansion pressure of the passenger airbag cushion.

SUMMARY OF THE INVENTION

It is an object of the present invention to provide a passenger airbag system that can prevent the airbag cushion from pressing the head of an occupant in a child restraint system mounted on the passenger seat.

The present invention is not limited to the object and other objects, which are not described above, can be obviously understood by those skilled in the art from the following description.

In order to achieve the objects of the present invention, a passenger airbag system according to an embodiment of the present invention includes: an airbag cushion inflated by gas flowing inside and including a head contact portion that contacts the head of an occupant in a child restraint system mounted on the passenger seat; a strap connected to the head contact portion; and a tether connected to the airbag cushion and pulling the strap such that the head contact portion is depressed, when the airbag cushion inflates.

Other configurations of embodiments are included in the detailed description and drawings.

A passenger airbag system according to the present invention has the advantage of preventing an airbag cushion from pressing down the head of the occupant in a child restraint system, because the head contact portion of the airbag cushion which contacts the head of the occupant in the child restraint system is depressed, when the airbag cushion inflates.

The present invention is not limited to the above-mentioned effects and other effects, which are not described above, can be obviously understood to those skilled in the art from the claims.

DETAILED DESCRIPTION OF THE PREFERRED EMBODIMENTS

Figure 1:
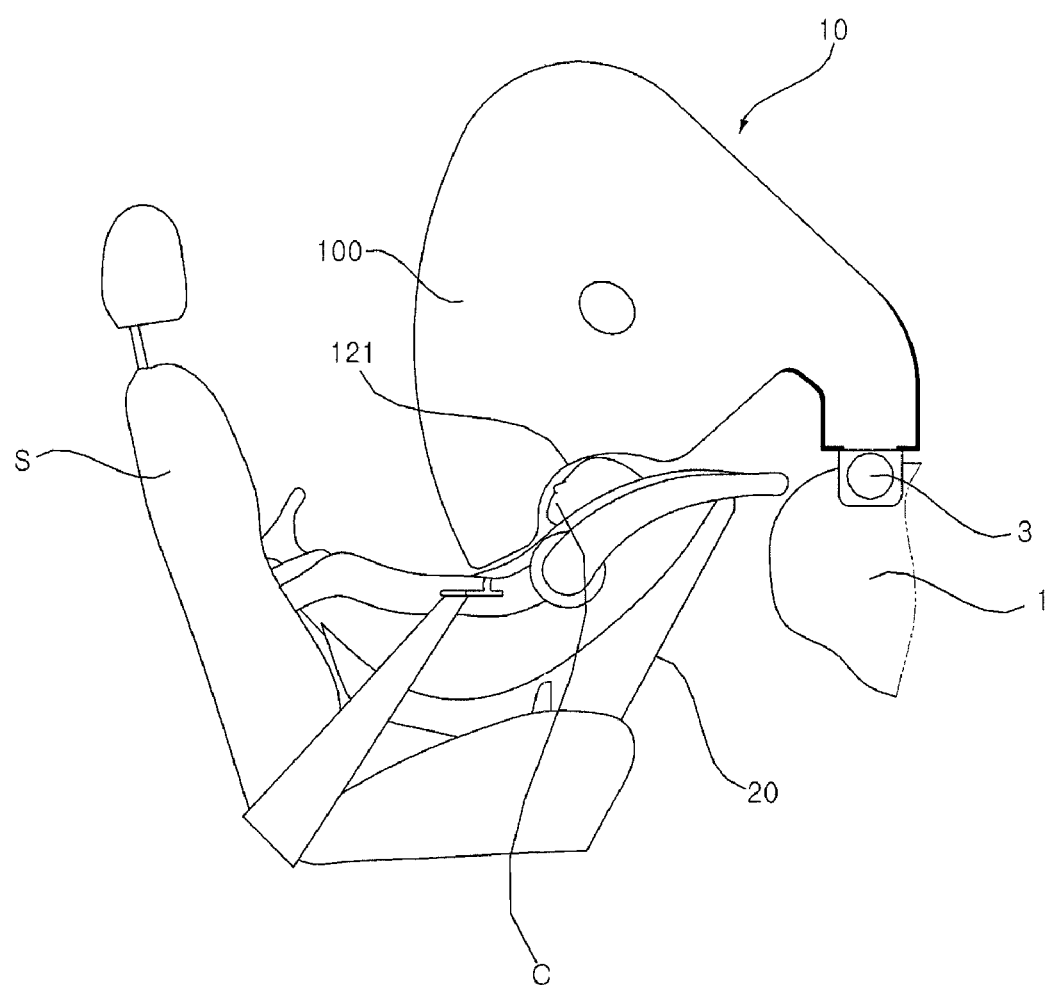
FIG. 1 is a view illustrating the operation of a passenger airbag system according to an embodiment of the present invention.

Advantages and features of the present invention, and methods of achieving them will be clear from the embodiments described below in detail with reference to the accompanying drawings. However, the present invention is not limited to the embodiment described herein and may be implemented in various ways. Further, the embodiments help complete the present invention and are provided for those skilled in the art to help completely understand the spirit of the present invention, and the present invention is defined within the claims. The same reference numerals represent the same components throughout the specification.

A passenger airbag system according to an embodiment of the present invention will be described hereafter with reference to the drawings.

FIG. 1 is a view illustrating the operation of a passenger airbag system 10 according to an embodiment of the present invention.

Referring to FIG. 1, the passenger airbag system 10 according to an embodiment of the present invention is disposed in an instrument panel 1 positioned forward apart from a passenger seat S in a vehicle.

The passenger airbag system 10 includes an inflator 3 generating gas and an airbag cushion 100 connected with the inflator 3. The airbag cushion 100 protect an occupant in the passenger seat S when inflated by the gas flowing inside from the inflator 3.

Infants or children, as well as adults, sit in the passenger seat S.

A child restraint system 20 is mounted on the passenger seat S and the infants or the children are laid in the child restraint system 20, with the head positioned toward to the front.

North America has prescribed that the infants and the children are classified into infants 1 year or under and 3 year or under and children 6 years or under to protect all of them from being hurt due to the expansion pressure of the aircushion bag 100. Therefore, the occupant C of the child restraint system 20 considers all of the infants 1 year or under, 3 years or under, and children 6 years or under.

The airbag cushion 100 includes a head contact portion 121 that contacts the head of the occupant C in the child restraint system 20.

Figure 2:
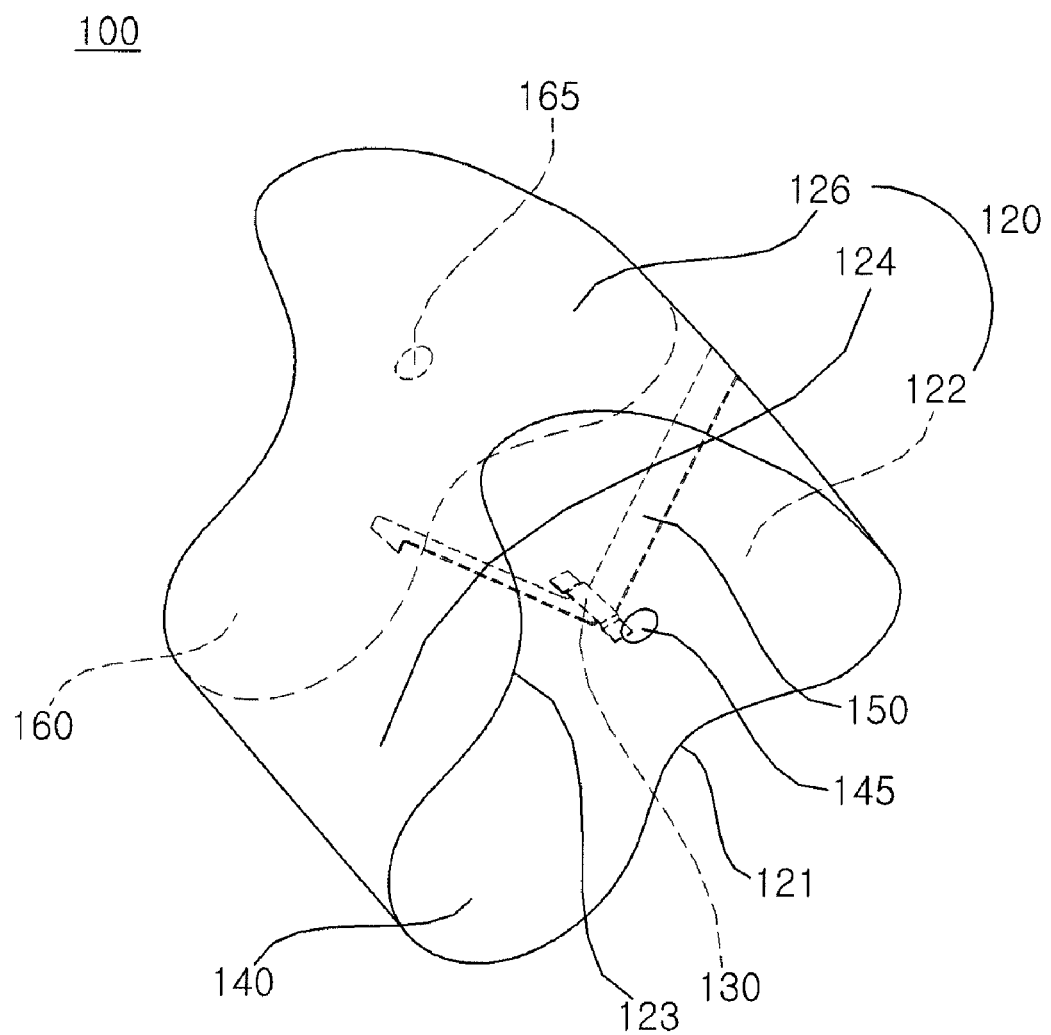
FIG. 2 is a perspective view of the airbag cushion shown in FIG. 1.

FIG. 2 is a perspective view of the airbag cushion 100 shown in FIG. 1.

Referring to FIGS. 1 and 2, the airbag cushion 100 includes a main panel 120 that contacts the occupant in the passenger seat S and side panels 140 and 160 connected at both sides of the main panel 120.

The side panels 140 and 160 are a first side panel 140 connected to the right side of the main panel 120 and a second side panel 160 connected to the left side of the main panel 120.

Vent holes 145 and 165 discharging gas are formed through the first side panel 140 and the second side panel 160 to prevent the airbag cushion 100 from inflating at excessive expansion pressure. In other words, the gas flowing inside the airbag cushion 100 from the inflator 3 after the airbag cushion 100 expands to an appropriate size is discharged outside the airbag cushion 100 through the vent holes 145 and 165, such that the airbag cushion 100 can maintain appropriate expansion pressure.

The main panel 120 has a rear 122 where the head contact portion 121 is formed, a front 124 disposed apart from the rear 122 and facing the rear 122, and a top 126 connecting the front 124 and the rear 122.

A groove 123 depressed inward is formed at the front 124 and the head contact portion 121 depressed inward is formed at the rear 122.

The groove 123 is continuously formed at the front 124 from the first side panel 140 to the second side panel 160 and the head contact portion 121 is continuously formed at the rear 122 from the first side panel 140 to the second side panel 160.

When an adult sits in the passenger seat S and the airbag cushion 100 inflates, the front 124 contacts and protects the adult.

Further, when the occupant C is in the child restraint system 20 on the passenger seat S and the airbag cushion 100 inflates, the rear 122 contacts and protects the occupant C. In this case, the head contact portion 121 of the rear 122 contacts the head of the occupant in the child restraint system 20.

However, since the occupant C in the child restraint system 20 is physically weaker than the adult, the head contact portion 121 may hurt the neck of the occupant C in the child restraint system 20 by pressing down the head of the occupant C in the child restraint system 20 due to excessive expanding pressure when contacting the head of the occupant C in the child restraint system 20.

Therefore, in order to prevent the occupant C in the child restraint system 20 from being hurt due to the excessive expansion pressure of the head contact portion 121, a strap 130 is connected to the head contact portion 121 of the airbag cushion 100, and a tether 150 is connected to the airbag cushion 100 to pull the strap 130 such that the head contact portion 121 is depressed when the airbag cushion 100 inflates.

Figure 3:
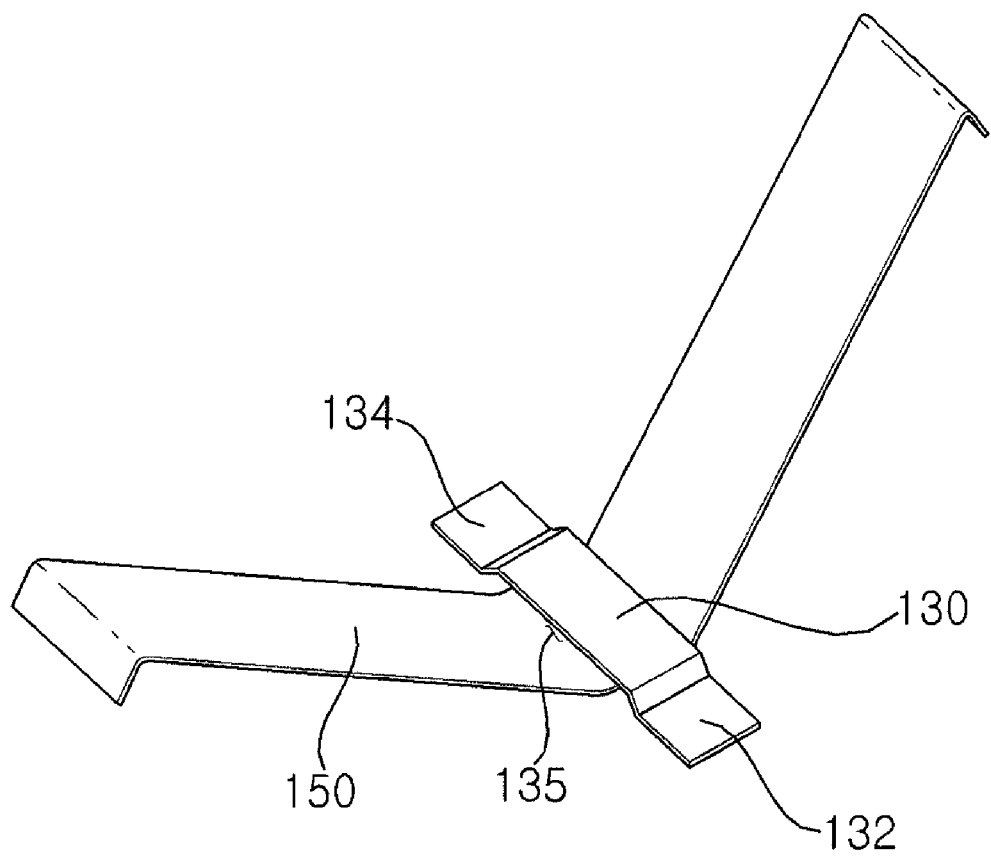
FIG. 3 is a perspective view showing the strap and a tether shown in FIG. 2.

FIG. 3 is a perspective view showing the strap 130 and the tether 150 shown in FIG. 2.

Referring to FIGS. 2 and 3, the strap 130 is connected to the head contact portion 121 in the airbag cushion 100.

Both ends 132 and 134 of the strap 130 are attached to the head contact portion 121 but a portion between the ends 132 and 134 is not attached to the head contact portion 121, such that a hole 135 through which the tether 150 passes is defined between the strap 130 and the head contact portion 121.

The tether 150 has one end attached to the top 126 of the airbag cushion 100 through the hole 135 and the other end attached to the groove 123 of the front 124 of the airbag cushion 100, to be movable through the hole 135.

The tether 150 is disposed inside the airbag cushion 100 and of which one end is attached to a middle portion between the first side panel 140 and the second side panel 160 of the top 126 of the airbag cushion 100 and the other end is attached to a middle portion between the first side panel 140 and the second side panel 160 of the groove 123 of the airbag cushion 100.

On the other hand, when the strap 130 is made of an inflexible material, the head of the occupant C in the child restraint system 20 may be hurt due to the inflexibility of the strap 130, when the head contact portion 121 of the airbag cushion 100 contacts the head of the occupant C in the child restraint system 20.

Therefore, it is preferable that the strap 130 is made of a flexible material. The strap 130 is made of the same material as the airbag cushion 100 in this embodiment. In detail, the strap 130 is formed by coating the fabric with silicon that can sustain gas temperature and sewing the fabric to the head contact portion 121.

Further, similar to the strap 130, the tether 150 is preferably made of a flexible material. The tether 150 is also made of the same material as the airbag cushion 100 in this embodiment, similar to the strap 130. In detail, the tether 150 is formed by coating the fabric with silicon that can sustain gas temperature, and of which one end is sewn to the top 126 of the airbag cushion 100 through the hole 135 and the other end is sewn to the groove 123 of the front 124 of the airbag cushion 100.

The operation of the passenger airbag system 10 having the configuration according to an embodiment of the present invention is as follows.

Figure 4:
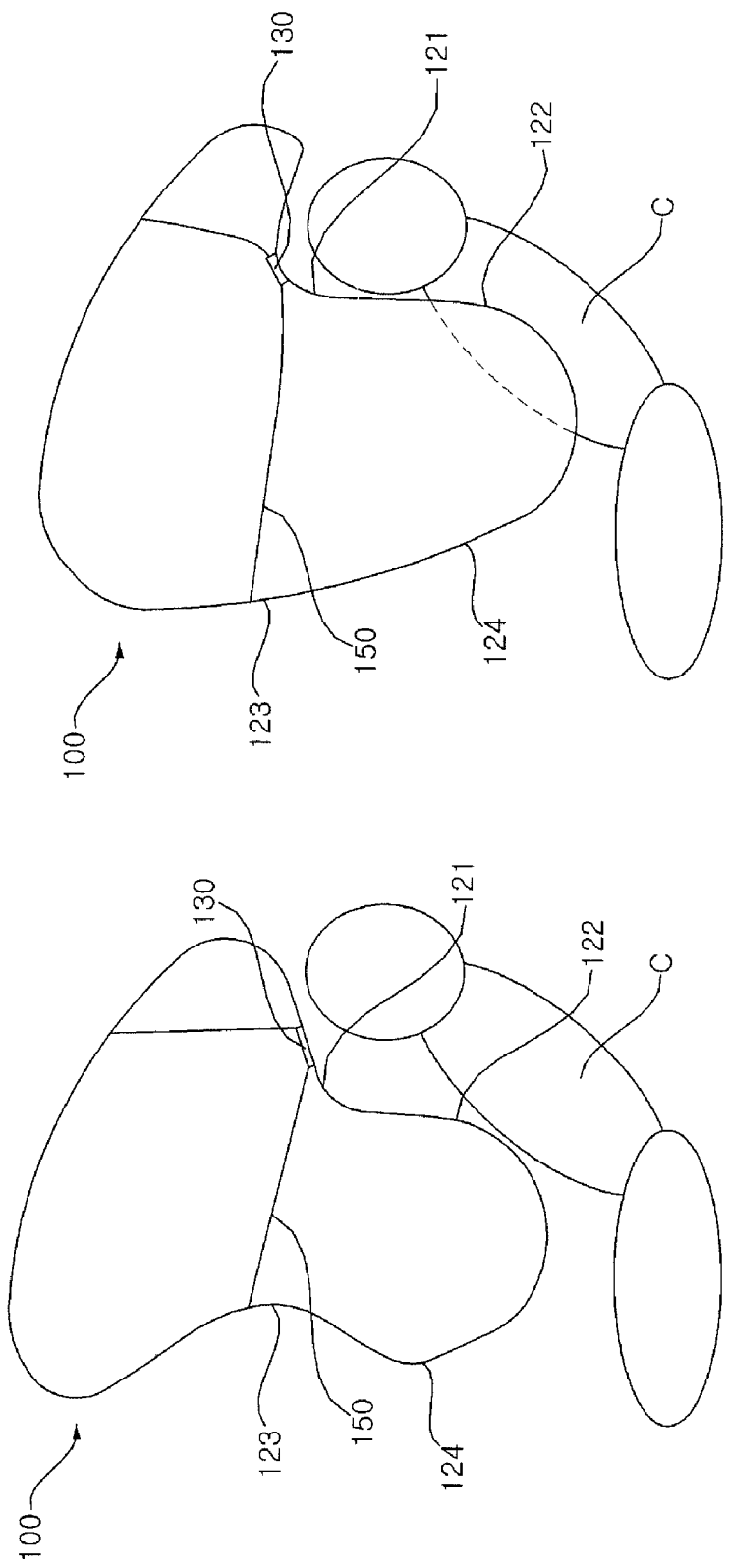
FIG. 4 is a view illustrating the operation of an airbag cushion shown in FIG. 2.

FIG. 4 is a view illustrating the operation of the airbag cushion 100 shown in FIG. 2. In FIG. 4, (a) is a view illustrating when the airbag cushion 100 does not fully expand and (b) is a view illustrating when the airbag cushion 100 fully expands.

First, when gas flows into the airbag cushion 100 from the inflator 3, as shown in (a) of FIG. 4, the groove 123 depressed inward remains in the front 124 of the airbag cushion 100 and the head contact portion 121 depressed inward remains in the rear 122, before the airbag cushion 100 fully expands.

In this position, as the gas continues flowing into the airbag cushion 100 from the inflator 3, the airbag cushion 100 starts to further inflate, in which the groove 123 on the front 124 pulls the tether 150 while expanding.

Accordingly, the tether 150 pulls the strap 130, moving along the groove 123 when the groove 123 expands, and the airbag cushion 100 correspondingly fully expands. After the groove 123 completely expands, as shown in (b) of FIG. 4, the head contact portion 121 depressed inward from the rear 122 is further depressed, such that it is possible to prevent the airbag cushion 100 from pressing down the head of the occupant C in the child restraint system 20.

In particular, in the passenger airbag system 10 according to an embodiment of the present invention, it could be seen that the head contact 121 remained depressed even in 50 msec after the airbag cushion 100 started inflating. That is, the airbag cushion 100 was prevented from pressing the head of the occupant C in the child restraint system 20 by reducing the initial expansion pressure of the airbag cushion 100 in the related art; however, in this configuration, the expansion pressure of the airbag cushion 100 increase again 50 msec after the airbag cushion 100 starts inflating, such that the airbag cushion 100 may still press down the head of the occupant C in the child restraint system 20. However, in the passenger airbag system 10 according to an embodiment of the present invention, since the head contact portion 121 keeps depressed even 50 msec after the airbag cushion 100 starts inflating, it is possible to more securely prevent the airbag cushion 100 from pressing down the head of the occupant C in the child restraint system 20.

While certain embodiments have been described above, it will be understood to those skilled in the art that the embodiments described are by way of example only. Accordingly, it should be construed that the embodiments described herein are just exemplified and not limited. The scope of the present invention is defined in the following claims and all changed or modified types derived from the meanings and scope of the claims and the equivalent concept thereof should be construed as being included in the scope of the present invention.

What is claimed is:

1. A passenger airbag system, comprising:
    an airbag cushion inflated by gas flowing inside and including a head contact portion for contacting the head of an occupant in a child restraint system mounted on the passenger seat;
    a strap connected to the head contact portion; and
    a tether connected to the airbag cushion and pulling the strap such that the head contact portion is depressed, when the airbag cushion is completely deployed.

2. The passenger airbag system according to claim 1, wherein the airbag cushion includes:
    a rear where the head contact portion is formed;
    a front spaced apart from the rear and facing the rear; and
    a top connecting the front with the rear,
    wherein the tether has one end connected to the top and the other end connected to the front such that the tether passes across a first space inside the airbag cushion between the strap and the top to which said one end of the tether is connected, and a second space inside the airbag cushion between the strap and the front to which the other end of the tether is connected.

3. The passenger airbag system of claim 2, wherein the head contact portion faces an instrument panel facing the passenger seat and the front faces the back of the passenger seat, when the airbag cushion is deployed.

4. The passenger airbag system according to claim 1, wherein both ends of the strap are connected to the head contact portion but a portion between the both ends of the strap is not connected to the head contact portion, such that a hole through which the tether passes is defined between the strap and the head contact portion.

5. The passenger airbag system according to claim 4, wherein the tether is disposed movably through the hole.

6. The passenger airbag system according to claim 1, wherein the tether or the strap is disposed in the airbag cushion.

7. The passenger airbag system according to claim 1, wherein the tether or the strap is made of a flexible material.

8. The passenger airbag system according to claim 1, wherein the tether or the strap is sewn to the airbag cushion.

9. The passenger airbag system according to claim 1, wherein the head contact portion remains depressed even 50 msec after the airbag cushion starts inflating.

10. The passenger airbag system of claim 1, wherein the head contact portion is positioned between the back of the passenger seat and the head of the occupant, when the airbag cushion is deployed.

11. A passenger airbag system, comprising:
    an airbag cushion inflated by gas flowing inside and including a head contact portion for contacting the head of an occupant in a child restraint system mounted on the passenger seat;
    a strap connected to the head contact portion; and
    a tether connected to the airbag cushion and pulling the strap such that the head contact portion is depressed, when the airbag cushion inflates,
    wherein the airbag cushion includes:
    a rear where the head contact portion is formed;
    a front spaced apart from the rear and facing the rear; and
    a top connecting the front with the rear,
    wherein the tether has one end connected to the top and the other end connected to the front,
    wherein the front has a groove depressed inward at the portion where the tether is connected.

12. The passenger airbag system according to claim 11, wherein the airbag cushion includes:
    a main panel having the rear, the front, and the top; and
    a first side panel and a second side panel that are connected to both sides of the main panel, respectively,
    wherein the tether has one end connected to a middle portion between the first side panel and the second side panel in the top and the other end connected to a middle portion between the first side panel and the second side panel in the groove.

13. The passenger airbag system according to claim 11, wherein the rear is depressed inward to form the head contact portion and the tether pulls the strap while moving with the groove, when the groove expands such that the head contact portion is further depressed.

* * * * *